United States Patent

[11] 3,618,997

| [72] | Inventor | Hugh M. Cochrane<br>23 Taber Road, Toronto, Ontario, Canada |
|---|---|---|
| [21] | Appl. No. | 859,874 |
| [22] | Filed | Sept. 22, 1969 |
| [45] | Patented | Nov. 9, 1971 |

[54] BATTERY STRAP HOLDER
5 Claims, 7 Drawing Figs.

[52] U.S. Cl. .................................................. 294/63 B,
     294/27 H, 294/92
[51] Int. Cl. ................................................... B25b 9/00
[50] Field of Search ........................................ 294/92, 27
     H, 63 B; 224/45.6

[56] References Cited
UNITED STATES PATENTS
1,927,920  9/1933  Colley .......................... 294/63 B
FOREIGN PATENTS
766,951  7/1934  France .......................... 294/63 B Primary Examiner—Evon C. Blunk
Assistant Examiner—Johnny D. Cherry
Attorney—Cushman, Darby & Cushman ABSTRACT: A lifting device for electric storage batteries which comprises a flexible nonmetallic lifting handle and a gripping member recessed in each end of said handle, said handle and said gripping members having concomitant circular openings of a size and shape capable of receiving and gripping the terminal posts of a storage battery.

PATENTED NOV 9 1971            3,618,997
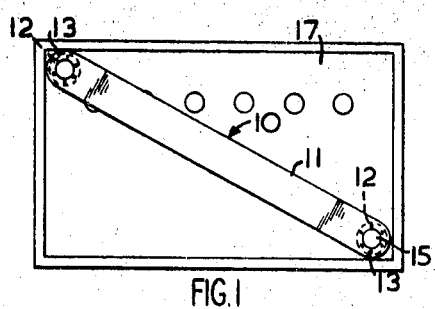
FIG.1
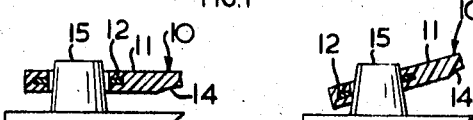
FIG.2    FIG.3
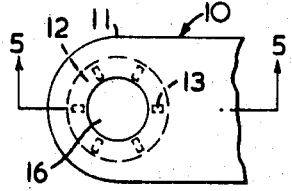
FIG.4
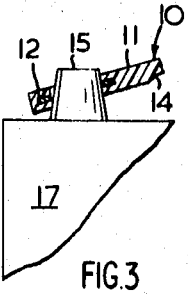
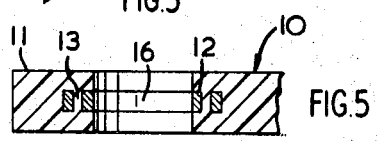
FIG.5
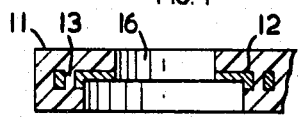
FIG 6
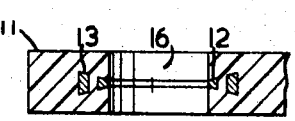
FIG 7
INVENTOR
HUGH M. COCHRANE
BY Cushman Darby & Cushman
ATTORNEYS

BATTERY STRAP HOLDER

This invention relates to an improved type of storage battery lifting device and more particularly to a type of battery lifting device which is substantially of unitary construction and, therefore, inexpensive to manufacture, and which is designed to lift a storage battery by engaging with the terminal posts of the said battery.

Previous battery lifting devices comprised from five to 11 separate components making them not only complicated and expensive to manufacture, but also susceptible to breakage and malfunctioning.

In view of the presence of battery acid on and around the terminal posts of storage batteries, all battery lifting devices which engage the terminal posts with metal gripping members are highly susceptible to corrosion damage. The result is that battery lifting devices of this type have a limited useful life and, accordingly, the cost of the device becomes an important consideration.

There is, therefore, a need for a simple, economically constructed battery lifting device which will reasonably resistant to corrosion but which will be sufficiently inexpensive that is can be disposed of when corrosion and wear reduce its usefulness.

In addition, there is a need for a battery lifting device which is sufficiently inexpensive to manufacture that is can be included as an accessory with the sale of a new storage battery.

An object of this invention, therefore, is to provide an improved storage battery lifter of simple and economical construction which resists corrosion by having its metal gripping members unitarily moulded into a corrosion resistant flexible handle.

Another object of this invention is to provide a battery lifter wherein the separate means for securing the flexible handle to the metal-gripping members is eliminated.

A further object of this invention is to provide a battery lifter which is adaptable to fit nearly all types of storage batteries including those where the vent plugs are relatively high and close to the terminal posts and which is operative regardless of which side of the holder is used.

Accordingly, this invention relates to a lifting device for storage batteries consisting of a flexible plastic lifting handle and a pair of spaced metal-gripping members one of which is recessed in each end of said handle; said handle and said gripping members having concomitant transversely extending apertures of sufficient diameter to extend over the ends of the battery terminal posts to permit the gripping member to engage and grip said terminal posts when the handle is lifted upwards at substantially its midsection.

Other features of this invention particularly relating to details of construction and operation will become apparent from the following description, read in conjunction with the accompanying drawings illustrating the invention by way of example and in which:

FIG. 1 is a top plan view of a storage battery showing the lifting device embodying this invention;

FIG. 2 is a partial side elevational view of the lifting device in nongripping association with the terminal posts;

FIG. 3 is a partial side elevational view of the lifting device in gripping association with the terminal posts;

FIG. 4 is a top plan view detail of the gripping member showing the same recessed in one end of the flexible lifting strap;

FIG. 5 is a side sectional view detail of the gripping member showing the same recessed in one end of the flexible lifting strap;

FIG. 6 is a side sectional view detail of an alternative embodiment of said invention;

FIG. 7 is a side sectional view detail of a further alternative embodiment of said invention.

The lifting device 10 illustrated in FIG. 1 comprises a flexible elongated plastic handle 11 and a pair of spaced metal-gripping members 12 one of which is recessed in each end of said handle; said handle being in the form of a broad flexible strap thereby causing a minimum of discomfort to the person holding the handle with the storage battery 17 attached thereto. At point 14 on each end of said handle 11 the cross-sectional area of said handle 11 is increased as illustrated in FIGS. 2 and 3 so as to accommodate said gripping member 12. The handle 11 may be constructed of any suitable plastic material which is flexible and which has the requisite tensile strength for lifting and carrying a storage battery and which is nonconducting so as to prevent short circuiting between the two battery terminal posts and which is noncorrosive.

The gripping member 12 may comprise a one-piece metallic plate structure in the shape of a common washer, said member 12 having a central opening 16 of a size suitable to receive the terminal post 15 of a storage battery 17 and to grip said terminal post 15 when said handle 11 is lifted at substantially its midsection. Between the periphery of said opening 16 and the outside periphery of gripping member 12 are a plurality of holes 13. The gripping members 12 are unitarily molded with handle 11 as illustrated in FIGS. 2, 3, 4 and 5 in such a manner as to permit the plastic material comprising handle 11 to flow into and through openings 13 of gripping members 12 while said plastic material is in its liquid state but so as to prevent the plastic material comprising handle 11 from flowing to opening 16. When said handle 11 has solidified, the plastic material contained in said openings 13 will function to prevent gripping members 12 from being torn from handle 11 when said gripping members 12 are engaged with the terminal posts 15 of battery 17.

As can readily be appreciated, handle 11 must be of sufficient cross section and rigidity from point 14 to the end of said handle that it will cause gripping member 12 to tilt into gripping engagement with terminal post 15 when said handle 11 is lifted at substantially its midpoint.

In operation, the openings 16 in the gripping members 12 may be placed over terminal posts 15 until the periphery of openings 16 engage with the said terminal posts 15. The handle 11 is then grasped substantially at its midpoint and is lifted upwardly, which movement causes the metal-gripping members 12 to tilt sufficiently so as to bite or grip the terminal posts 15 to such an extent that the storage battery 17 can be lifted and carried about without danger of accidental disengagement. It can readily be seen that as the terminal posts 15 are in diagonally opposite corners of the storage battery, the center of gravity of the storage battery 17 will be substantially below and in the same vertical plane as the lifting device 10 with the result that the battery 17 will remain in a substantially stable and level position when it is lifted and carried by means of the said lifting device 10.

This invention can also be used with most storage batteries having terminal posts in locations other than the diagonally opposite corners thereof. In this event, however, the battery may be tilted slightly when being transported by means of the lifting device 10 due to the terminal posts being offset from the battery's centerline of gravity.

The handle 11 of lifting device 10 may be moulded from any suitable thermoplastic or thermosetting plastic material such as polyvinyl chloride, polystyrene, polyethylene or nylon. The gripping members 12 which may be fabricated from any suitable metallic material such as steel or bronze, must be inserted into the holder mould so as to be unitarily formed with the said handle 11. When the plastic resin cools or solidifies, the gripping members 12 are integrally moulded into the said handle 11 and only the peripheral edge of opening 16 is exposed to corrosive damage by battery acids.

As an alternative embodiment of this invention, gripping members 12 may be of varying cross-sectional shapes as illustrated in FIGS. 6 and 7. In FIG. 6, the thickness of the periphery of hole 16 of gripping member 11 has been reduced thereby increasing the "biting" or gripping ability of said gripping member 11. In FIG. 7, the thickness of the periphery of hole 16 has similarly been reduced by tapering gripping member as illustrated.

As a further alternative embodiment of this invention, the gripping members 12 may be of any suitable nonmetallic noncorrosive substance which is capable of gripping or biting into the terminal posts 15 of the battery 17. In this embodiment of the invention the risk of corrosion damage to the gripping members would be eliminated thus substantially prolonging the useful life of the lifting device.

While the preferred embodiments of the invention have been described, it is to be understood that changes and modifications may be resorted to without departing from the spirit of the invention as defined in appended claims.

I claim:

1. A lifting device for storage batteries having a pair of terminal posts projecting from the uppermost side thereof and comprising a flexible nonmetallic lifting handle and a pair of spaced gripping members in the shape of common washers, one of said gripping members being recessed at each end of said handle; said handle and said gripping members having concomitant transversely extending central apertures of sufficiently large diameter to extend over the terminal posts of a storage battery and to permit the gripping member to engage and grip said terminal posts when said handle is lifted upwards at substantially its midsection; said gripping members having a plurality of smaller apertures disposed around the central aperture thereof at substantially the median of the inner and outer periphery of said gripping members; said smaller apertures being filled with the material comprising said handle or strap thereby securing said gripping members in said handle or strap.

2. A lifting device as in claim 1 in which the gripping members are nonmetallic and substantially noncorrosive.

3. A lifting device as in claim 1 in which the depth of the gripping members is reduced at the point of engagement of said gripping members with said terminal posts.

4. A lifting device as in claim 1 in which the gripping members are steel.

5. A lifting device as in claim 1 in which the gripping members are bronze.